(12) United States Patent
Puerstinger

(10) Patent No.: US 11,532,437 B2
(45) Date of Patent: Dec. 20, 2022

(54) MULTILAYER DEVICE AND METHOD FOR PRODUCING A MULTILAYER DEVICE

(71) Applicant: TDK Electronics AG, Munich (DE)

(72) Inventor: Thomas Puerstinger, Grossklein (AT)

(73) Assignee: TDK ELECTRONICS AG, Munich (DE)

( * ) Notice: Subject to any disclaimer, the term of this patent is extended or adjusted under 35 U.S.C. 154(b) by 526 days.

(21) Appl. No.: 16/605,693

(22) PCT Filed: Apr. 17, 2018

(86) PCT No.: PCT/EP2018/059751
§ 371 (c)(1),
(2) Date: Oct. 16, 2019

(87) PCT Pub. No.: WO2018/192912
PCT Pub. Date: Oct. 25, 2018

(65) Prior Publication Data
US 2020/0126730 A1 Apr. 23, 2020

(30) Foreign Application Priority Data
Apr. 20, 2017 (DE) .................. 10 2017 108 384

(51) Int. Cl.
*H01G 4/30* (2006.01)
*H01G 4/012* (2006.01)
*H01G 4/12* (2006.01)
*H01G 4/236* (2006.01)

(52) U.S. Cl.
CPC .............. *H01G 4/30* (2013.01); *H01G 4/012* (2013.01); *H01G 4/1218* (2013.01); *H01G 4/236* (2013.01)

(58) Field of Classification Search
CPC ........ H01G 4/30; H01G 4/012; H01G 4/1227; H01G 4/2325; H01G 4/1209; H01G 4/228; H01G 4/306; H01G 4/248; H01G 4/1218; H01G 4/236
See application file for complete search history.

(56) References Cited

U.S. PATENT DOCUMENTS

| 4,868,711 A | 9/1989 | Hirama et al. |
| 5,034,850 A | 7/1991 | Hernandez et al. |
| 5,870,273 A | 2/1999 | Sogabe et al. |
| 8,410,891 B2 | 4/2013 | Feichtinger et al. |

(Continued)

FOREIGN PATENT DOCUMENTS

| CN | 1180908 A | 5/1998 |
| CN | 104867673 A | 8/2015 |

(Continued)

*Primary Examiner* — Michael P McFadden
(74) *Attorney, Agent, or Firm* — Slater Matsil, LLP

(57) ABSTRACT

A multilayer device and a method for producing a multilayer device are disclosed. In an embodiment a multilayer device includes a main body having at least two external electrodes, at least one first internal electrode; at least one second internal electrode, wherein each internal electrode is electrically conductively connected to an external electrode, a plurality of ceramic layers, wherein the ceramic layers comprise the internal electrodes and at least one dielectric layer, wherein, viewed along a stack direction of the ceramic layers, the dielectric layer being arranged between the internal electrodes, and wherein the dielectric layer is printed onto at least one sub-region of one of the ceramic layers.

14 Claims, 2 Drawing Sheets

(56) References Cited

U.S. PATENT DOCUMENTS

| | | |
|---|---|---|
| 8,471,672 B2 | 6/2013 | Feichtinger et al. |
| 8,970,324 B2 | 3/2015 | Dudesek et al. |
| 9,532,454 B2 | 12/2016 | Block et al. |
| 2001/0016256 A1* | 8/2001 | Chazono ................. B32B 18/00 428/402 |
| 2005/0248418 A1* | 11/2005 | Govind ................ H03H 7/1775 331/179 |
| 2006/0232911 A1* | 10/2006 | Ito ........................... C04B 35/64 361/321.4 |
| 2009/0021340 A1* | 1/2009 | Koyama .................. H01C 7/18 338/20 |
| 2009/0035560 A1* | 2/2009 | Block ...................... H01G 4/40 428/428 |
| 2011/0298578 A1* | 12/2011 | Feichtinger ............ H01C 7/112 338/20 |
| 2012/0044039 A1* | 2/2012 | Feichtinger ............. H01C 7/18 338/20 |
| 2013/0083439 A1* | 4/2013 | Hayakawa ............. H03H 7/465 361/56 |
| 2015/0042415 A1* | 2/2015 | Hurwitz ................... H03H 3/00 333/185 |
| 2015/0146343 A1* | 5/2015 | Ellmore ................ H01G 2/103 361/301.4 |
| 2015/0243439 A1 | 8/2015 | Kwag |

FOREIGN PATENT DOCUMENTS

| | | |
|---|---|---|
| DE | 3889614 T2 | 12/1994 |
| DE | 102006000935 A1 | 7/2007 |
| DE | 102009007316 A1 | 8/2010 |
| DE | 102009010212 A1 | 9/2010 |
| DE | 102009014542 B3 | 12/2010 |
| EP | 2381451 A1 | 10/2011 |
| JP | H09148109 A | 6/1997 |
| WO | 2007105865 A1 | 9/2007 |

* cited by examiner

Prior Art

MULTILAYER DEVICE AND METHOD FOR PRODUCING A MULTILAYER DEVICE

This patent application is a national phase filing under section 371 of PCT/EP2018/059751, filed Apr. 17, 2018, which claims the priority of German patent application 102017108384.7, filed Apr. 20, 2017, each of which is incorporated herein by reference in its entirety.

TECHNICAL FIELD

A multilayer device is described. A method for producing a multilayer device is furthermore described.

BACKGROUND

The parasitic capacitance of ESD protection devices may not exceed certain maximum values due to the ever higher transmission frequencies of the lines to be protected and, in addition to low capacitance, must also exhibit slight variance. An ESD protection device conventionally consists of a material with a nonlinear U-I characteristic curve, to which are applied internal electrodes which are in turn connected to external electrodes. In order to minimize the parasitic capacitance of the electrode pairs, efforts are made to minimize the overlap area between the internal electrodes to the greatest possible extent at constant spacing.

Patent Application Publication DE 10 2009 007316 A1 discloses an electrical multilayer device as an ESD protection device. The overlap area of the internal electrodes is divided by the provision of a dielectric layer with a punched aperture which is filled with a (semi)conductive material and parasitic capacitance is thus reduced.

SUMMARY OF THE INVENTION

Embodiments provide an improved multilayer device and a corresponding production method. Further embodiments provide a simple and inexpensive multilayer device which includes an ESD protection device with improved characteristics, for example, ultra-low capacitance.

A multilayer device is disclosed according to one aspect. The multilayer device has a main body with at least two external electrodes and at least one first and one second internal electrode, wherein in each case one internal electrode is electrically conductively connected to one external electrode. The respective internal electrode is electrically conductively connected with the respective external electrode either directly or by means of a through-via.

The multilayer device furthermore has a plurality of ceramic layers, preferably varistor layers. The ceramic layers comprise the internal electrodes. The internal electrodes are almost entirely surrounded by a material of the ceramic layers. The respective internal electrode is, however, freely contactable at least in a contact region with the respective external electrode.

The multilayer device furthermore has at least one dielectric layer. The multilayer device may also have a plurality of dielectric layers, for example, two, five or ten dielectric layers. Viewed along a stack direction of the ceramic layers, the dielectric layer is arranged between the internal electrodes. The dielectric layer is printed onto at least one sub-region of one of the ceramic layers, for example, by means of screen printing or inkjet printing.

Partially printing a ceramic layer with dielectric material makes it straightforwardly possible to reduce the overlap area between the internal electrodes and hence to lower parasitic capacitance. The multilayer device preferably has a capacitance of less than or equal to 0.5 pF, preferably 0.2 pF. The multilayer device may furthermore readily be fabricated thanks to the simple printing of ceramic layers with dielectric material. A simple, inexpensive multilayer device with ultra-low capacitance is thus provided.

According to one exemplary embodiment, the dielectric layer has an extent D along the stack direction of the ceramic layers, wherein 2 µm≤D≤6 µm. Because the dielectric layer is printed, it is possible to obtain a very low dielectric layer thickness. The mix of materials in the multilayer device is considerably reduced thereby. Differing extents at boundary layers can be avoided during the production process.

According to one exemplary embodiment, the at least one dielectric layer is divided in a direction perpendicular to the stack direction into at least two portions which are separate from one another. In other words, the dielectric layer has an opening.

The portions are produced automatically during printing of the dielectric layer. There is no longer any need for an additional aperture which is subsequently introduced into the dielectric layer. The portions of the dielectric layer are separated from one another by a material of the ceramic layer. There is thereby no longer any need to use filler materials and an additional filling step. A simplified and inexpensive multilayer device is consequently provided.

According to one exemplary embodiment, the opening between the portions has a polygonal or round cross-section. The geometry of the opening may be formed in any desired shape and with elevated accuracy during printing of the dielectric layer and thus be precisely adapted to the component's geometry.

According to one exemplary embodiment, the at least one dielectric layer includes magnesium titanate. Alternative materials are, however, also conceivable. The dielectric layer is printed onto the ceramic layer in the form of an ink or paste. Materials which are printable in the form of an ink or paste are thus preferably used.

According to one exemplary embodiment, the dielectric layer is formed and arranged in such a way that it, together with at least two adjacent ceramic layers and two overlapping internal electrodes, forms an ESD discharge gap. In particular, the multilayer device has the function of a varistor as an ESD protection device.

According to a further aspect, a method is described for producing a multilayer device. The multilayer device preferably corresponds to the above-described multilayer device. In particular, the production method may serve to produce a multilayer device as described above. The method has the following steps:

providing ceramic layers, wherein the ceramic layers include varistor layers. The ceramic layers are preferably provided in the form of green films.

applying an electrode material, preferably an electrode paste or ink, onto a surface of part of the ceramic layers to form internal electrodes. The electrode material is preferably printed onto the ceramic layers. The electrode material includes silver and/or palladium.

partially printing the surface of at least one ceramic layer with a dielectric material to form at least one dielectric layer. The dielectric material is preferably printed onto the ceramic layer in the form of a paste or ink by means of screen printing or inkjet printing. The dielectric material preferably includes magnesium titanate. The only partial printing gives rise to a discontinuous dielectric layer, in particular a dielectric layer which is subdivided into portions. The dielectric layer consequently automatically has at least one opening. Printing permits precise positioning of the portions or recess for reducing the overlap area between the internal electrodes.

stacking the at least one ceramic layer printed with the dielectric material between the ceramic layers provided with the electrode material.

pressing the ceramic layers to form a main body.

arranging external electrodes on opposing outer sides of the main body.

sintering the main body. Alternatively, the main body may also be sintered before arranging the external electrodes. The external electrodes are then stoved in a subsequent thermal step.

Printing one or more ceramic layers with dielectric in the form of a paste or ink ensures straightforward fabrication of the multilayer device. There is no longer any need, as in the prior art, to use complex and costly laser technology to punch apertures in the dielectric layer in order to produce a reduced overlap area between the internal electrodes.

The mix of materials in the multilayer device is furthermore substantially reduced, the associated problems of differing extents at the boundary layers no longer occur and nor do possible lamination problems when the dielectric layer is stacked on the ceramic layer (see, prior art) and vice versa.

Furthermore, there is no longer any need to fill the aperture/opening by means of metal paste which, in the case of an inaccurately positioned, laser-punched aperture, is impossible and thus leads to high reject rates. Overall, the above-described method provides a simplified and inexpensive multilayer device with ultra-low capacitance.

The above-described is explained in greater detail below with reference to exemplary embodiments.

BRIEF DESCRIPTION OF THE DRAWINGS

The drawings described below should not be regarded as being true to scale, individual dimensions possibly instead being represented on an enlarged or reduced scale or even in distorted manner.

In the figures.

DETAILED DESCRIPTION OF ILLUSTRATIVE EMBODIMENTS

Figure 1:
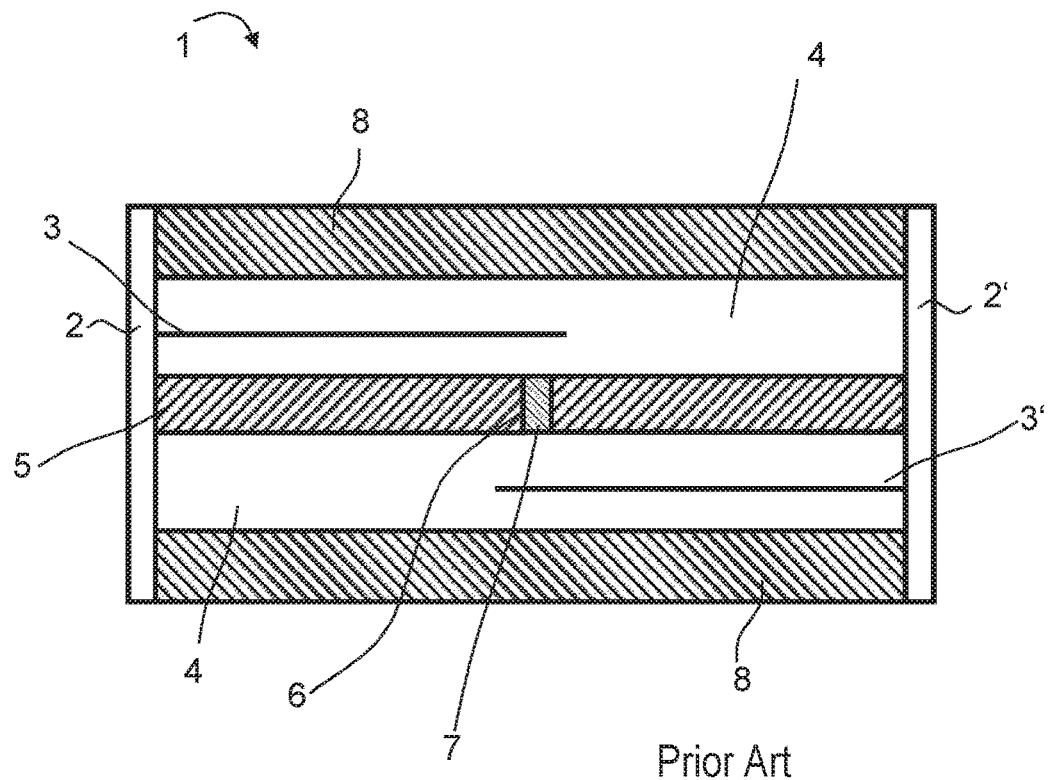
FIG. 1 shows a schematic structure of multilayer device according to the prior art.

FIG. 1 shows a multilayer device 1 according to the prior art. The multilayer device 1 has the function of a varistor as an ESD protection device.

The multilayer device 1 in particular has a main body on the side faces of which are arranged external electrodes 2, 2' which are electrically conductively connected to the internal electrodes 3, 3' located in the interior of the main body. The main body of the multilayer device 1 is terminated in the stack direction by a carrier material 8. The carrier material 8 preferably has at least one dielectric layer.

The main body furthermore has a ceramic layer 4, in particular a varistor layer. The ceramic layer 4 comprises a first internal electrode 3. The first internal electrode 3 is for the most part enclosed by the ceramic layer 4. The multilayer device 1 furthermore has a further ceramic layer 4', in particular a further varistor layer. The further ceramic layer 4' comprises a second internal electrode 3' which is for the most part enclosed by the further ceramic layer 4'.

A dielectric layer 5 is arranged between the ceramic layer 4 and the further ceramic layer 4'. The dielectric layer 5 has an aperture or recess 6. The aperture 6 is punched into the dielectric layer 5 using laser technology. This is in particular apparent from a round geometry of the aperture 6 and from the extent of the dielectric layer 5 in the stack direction (thickness of the dielectric layer 5). Laser machining only permits apertures 6 with a round geometry, the dimensions and target position of which on the dielectric layer 5 are subject to severe variance and can be adjusted via the laser power only with difficulty. The extent of the dielectric layer 5 in the stack direction must furthermore be sufficiently large for it to be at all possible to punch the aperture 6. For example, the dielectric layer 5 has an extent in the stack direction or thickness of at least 100 µm. The aperture 6 is filled with a semiconductive or conductive material 7, for example, metal.

The overlap area of the internal electrodes 3, 3' is divided by the dielectric layer 5. The parasitic capacitance of the ESD protection device is reduced thereby. A diameter of the aperture 6 amounts to between 10 µm and 50 µm, so making it possible to obtain a defined, small overlap area of the internal electrodes 3, 3', as shown in FIG. 1.

The drawback of this solution is the processability of the aperture 6 which can only be produced in a very complex manner by means of laser punching and filling the punched hole with, for example, a metal paste. Furthermore, an additional dedicated screen printing process is required for filling the aperture 6 with metal paste. In many cases, filling the aperture 6 from above is only feasible in very complex manner in combination with a vacuum from below. This makes production of the multilayer device 1 complicated and costly.

Before the actual laser punching process, the dielectric layer 5 must firstly be prepressed to make a stamping process possible at all. Restacking the already pressed and punched dielectric layer 5 on the ceramic layer 4, 4' is, however, almost impossible without lamination problems. If the dielectric layer 5 with a prepunched and filled aperture 6 is nevertheless stacked between the ceramic layers 4, 4', a thermal mismatch between the materials of the ceramic layers 4, 4', the dielectric layer 5, the external electrodes 2, 2' and the filling material of the aperture 6 must be taken into account during the subsequent sintering step.

Furthermore, a length or horizontal extent (extent perpendicular to the stack direction) of the aperture 6 is associated with the thickness of the (individual) dielectric layer 5. If a plurality of already punched dielectric layers 5 are stacked on one another in order to increase the length of the aperture 6, laser punching must always proceed very precisely at the same point in order to avoid any offset of the apertures 6 in the stacked state (see, FIG. 2). This increases the reject rate and further complicates production.

Figure 3:
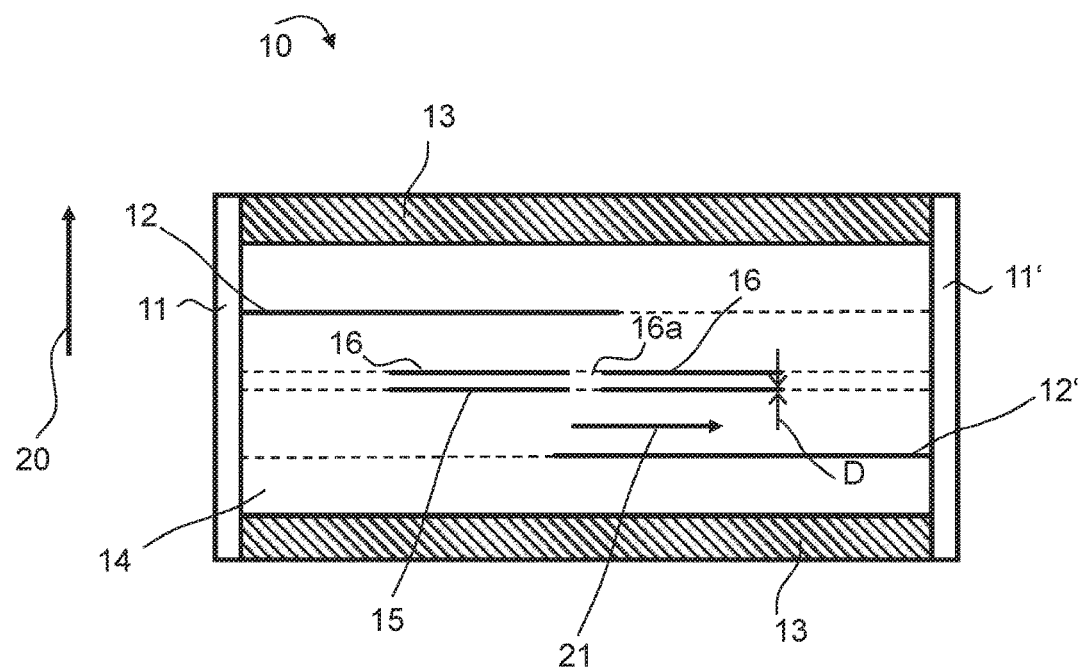
FIG. 3 shows a schematic structure of a multilayer device according to an embodiment.

The multilayer device 10 according to FIG. 3 solves the above-described problems in a simple manner.

FIG. 3 shows a multilayer device 10. The multilayer device 10 has the function of a varistor as an ESD protection device. The multilayer device 10 has a main body. The multilayer device 10, in particular the main body, has at least two external electrodes 11, 11'. The external electrodes 11, 11' are formed on opposing outer faces of the main body. The multilayer device 10, in particular the main body, has at least one first and one second internal electrode 12, 12'. The internal electrodes 12, 12' include, for example, silver and/or palladium. The internal electrodes 12, 12' have opposing polarity. An internal electrode 12, 12' is in each case electrically conductively connected to an external electrode 11, 11'.

The multilayer device 10, in particular the main body, has a plurality of ceramic layers 14. The ceramic layers 14 include a varistor material. The varistor material, for example, includes zinc oxide (ZnO) or praseodymium (Pr). The ceramic layers 14 are stacked on one another to form a stack. The ceramic layers 14 in the stack are indicated by the dashed lines in FIG. 3. The multilayer device 10 consequently has a stack direction 20 and a direction 21 perpendicular to the stack direction 20, as shown in FIG. 3.

The ceramic layers 14 comprise the internal electrodes 12, 12'. In particular, the internal electrodes 12, 12' are for the most part enclosed by the stack of ceramic layers 14. The main body of the multilayer device 10 is terminated in the stack direction 20 by a carrier material 13, such that the ceramic layers 14, the internal electrodes 12, 12' and dielectric layers 15 described hereinafter are, as shown in FIG. 3, arranged in the stack direction 20 between two layers with the carrier material 13. The carrier material 13 preferably includes a dielectric material in order to minimize the parasitic capacitance of the two external electrodes 11, 11'.

The multilayer device 10, in particular the main body, furthermore has at least one dielectric layer 15. The multilayer device 10 may, as shown in FIG. 3, also have a plurality of dielectric layers 15, for example, as shown, two or also more than two, for example, five or ten, dielectric layers 15. The one or more dielectric layers 15 are, viewed along the stack direction 20 of the ceramic layers 14, formed between the internal electrodes 12, 12'. In other words, the internal electrodes 12, 12' are formed above and below the one or more dielectric layers 15. The one or more dielectric layers 15 include, for example, magnesium titanate. Together with at least two or more adjacent ceramic layers 14 and two overlapping internal electrodes 12, 12', the one or more dielectric layers 15 form an ESD discharge gap.

The respective dielectric layer 15 is printed on a ceramic layer 14, in particular on a sub-region of this ceramic layer 14, for example, by means of screen printing or inkjet printing. The respective dielectric layer 15 is applied to the corresponding ceramic layer 14 in the form of a paste or ink. In particular, the dielectric material for forming the dielectric layer 15 includes no solid material. In contrast with the dielectric layer 6 according to FIG. 1, the dielectric layer 15 in the finished multilayer device 10 is thus a component part of the stack of ceramic layers 14.

The dielectric layer 15 has a very small thickness or extent D along the stack direction 20, as indicated in FIG. 3. The thickness D is accordingly between 2 µm and 6 µm, the limit values in each case being included. Thanks to individual ceramic layers 14 being printed with dielectric material, it is consequently possible in each case to obtain a very thin dielectric layer 15 on each of the ceramic layers. This is in contrast with the dielectric layer 6 from FIG. 1 which, as a result of the production process, has a many times greater thickness. The multilayer device 10 thus particularly preferably has a plurality of dielectric layers 15, wherein, viewed along the stack direction 20 of the ceramic layers 14, the dielectric layers 15 are arranged one above the other between the internal electrodes 12, 12', wherein each of the dielectric layers 15 is in each case printed onto a sub-region of one of the ceramic layers 14 and wherein the dielectric layers 15 in each case have an extent D with 2 µm≤D≤6 µm along the stack direction 20 of the ceramic layers 14.

The respective dielectric layer 15 is formed, in particular printed, discontinuously on the respective ceramic layer 14. In particular, the respective dielectric layer 15 is subdivided into at least two portions 16 in the direction 21 perpendicular to the stack direction 20. These portions 16 are separate from one another. In other words, there is an opening 16a in the dielectric layer 15 between the portions 16. In particular, there is a material of the ceramic layer 14 between the portions 16.

The opening 16a of the dielectric layer 15 is obtained during printing of the ceramic layer 14. An opening 16a with a predetermined geometry and size may in particular be produced by targeted printing of the dielectric layer 15 onto a ceramic layer 14.

The opening 16a is thus comparable with the aperture 6 described in connection with FIG. 1. This opening 16a, however, is obtained automatically during printing of the dielectric layer 15. Furthermore, there is no need to fill the opening 16a, since the opening 16a between the portions 16 is simply occupied by ceramic material 14. The opening 16a between the portions 16 has a variable geometry. In particular, the opening 16a may have a round or polygonal cross-section. An orifice diameter of the opening 16a is between 5 µm and 40 µm, for example, 20 µm or 25 µm.

An overlap area between the internal electrodes 12, 12' of opposite polarity is reduced in simple manner by the dielectric layer 15. Thanks to the specifically configured dielectric layer 15, the multilayer device 10 has a capacitance of ≤0.5 pF, for example, 0.2 pF. A multilayer device 10 with ultra-low capacitance is thus provided.

Furthermore, as shown in FIG. 3, the one or more dielectric layers 15 preferably do not extend up to the external electrodes 11, 11', but are instead spaced therefrom. Unlike in the prior art, the one or more dielectric layers 15 thus do not extend over the entire width from external electrode to external electrode of the multilayer device 10, but, as shown, are instead divided from the external electrodes 11, 11' by material of the ceramic layers 14. Thanks to the printing with the material of the one or more dielectric layers not extending completely to the edge, thus to the external electrodes, it is possible to minimize or entirely prevent shrinkage and detachment of the laminated layers during a sintering operation as described further below, since only one ceramic material, instead of two ceramic materials, is now present in the peripheral zone, thus adjacent to the external electrodes. In addition, material savings can also be made in comparison with the prior art.

Figure 2:
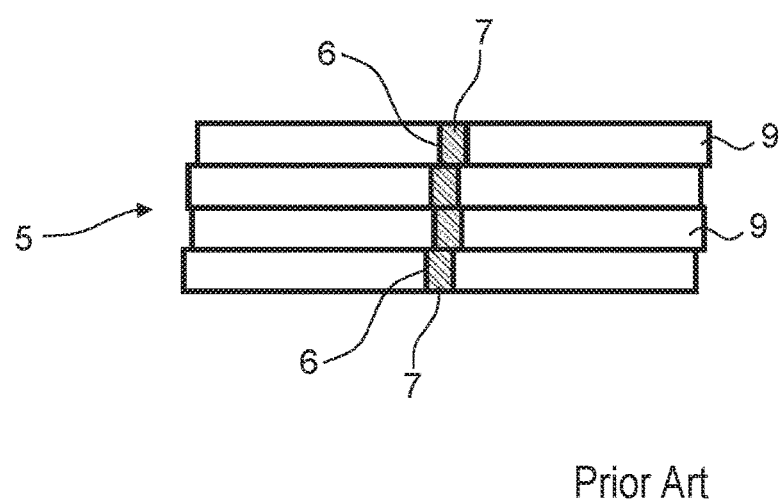
FIG. 2 shows a sub-region of the multilayer device according to FIG. 1.

In comparison with the prior art according to FIGS. 1 and 2, the dielectric layer 5 shown therein is thus simply replaced by further ceramic layers 14 on which dielectric material is printed. Thanks to the ceramic layers 14 being printed with a dielectric as a paste or ink, fabrication of the entire multilayer device 10 is rendered substantially simpler. There is no longer any need to punch apertures 6 by means of complex and costly laser technology. Furthermore, the geometry of the openings 16a and the spacing of the dielectric layers 15 from the external electrodes 11, 11' may be formed in any desired geometric shape and with greater accuracy and thus be adapted to the component's geometry. The mix of materials in the multilayer device 10 is furthermore substantially reduced, the associated problems of differing extents at the boundary layers between dielectric layer 15 and ceramic layer 14 and at the boundary layers of dielectric layer 15 and external electrode 11, 11' no longer occur and nor do possible lamination problems when the dielectric layer 15 is stacked on the ceramic layer 14 and vice versa.

Furthermore, there is no longer any need to fill the aperture/opening by means of metal paste which, in the case of an inaccurately positioned, laser-punched aperture, is impossible and thus leads to high reject rates. Overall, a substantially simpler and inexpensive multilayer device 10 is provided.

Figure 4:
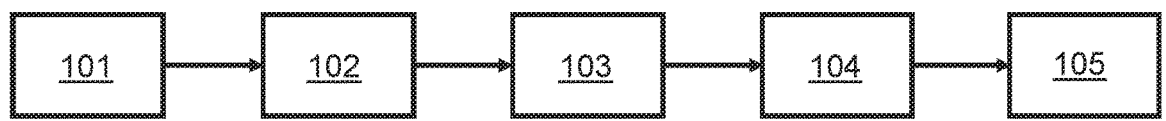
FIG. 4 shows a schematic representation of a method for producing the multilayer device according to an embodiment.

A method for producing the multilayer device 10 is described below in conjunction with FIGS. 3 and 4. All the features which were described in connection with the multilayer device 10 also apply to the method and vice versa.

In a first step 101, green ceramic films (hereinafter ceramic layers 14) are provided. The ceramic layers 14 include varistor layers. A plurality of ceramic layers 14 are provided.

In a further step 102, an electrode material is applied onto a surface of part of the ceramic layers 14 to form the internal electrodes 12, 12'. The ceramic layers 14 are preferably provided with an electrode paste. The green ceramic is coated with the electrode paste in the electrode pattern. The electrode paste includes silver and/or palladium.

In a further step 103, the surface of at least one ceramic layer 14 is partially printed with a dielectric material to form at least one dielectric layer 15. A plurality of ceramic layers 14 may preferably also be partially coated with the dielectric material to form a plurality of dielectric layers 15. The dielectric material preferably includes magnesium titanate. The dielectric material is printed onto the ceramic film in the form of a paste or ink. This proceeds by screen printing or inkjet printing.

In a further step 104, the one or more ceramic layers 14 printed with the dielectric material are arranged (stacked) between the ceramic layers 14 provided with the electrode material. The stack is then pressed to form a main body.

In a further step 105, the external electrodes 11, 11' are arranged on opposing outer sides of the main body. The main body is then sintered (co-sintering). In an alternative exemplary embodiment, the external electrodes 11, 11' may, however, also not be applied onto the outer sides until after the main body has been sintered. A further thermal step after application of the external electrodes 11, 11' thereby becomes necessary.

The description of the subject matter stated here is not limited to the individual specific embodiments. Instead, the features of the individual embodiments may, insofar as technically meaningful, be combined with one another as desired.

The invention claimed is:

1. A multilayer device comprising:
a main body comprising:
at least two external electrodes arranged at least at one outer side of the main body,
at least one first internal electrode;
at least one second internal electrode, wherein each internal electrode is electrically conductively connected to an external electrode;
a plurality of ceramic layers, wherein the ceramic layers comprise the internal electrodes; and
at least one dielectric layer,
wherein, viewed along a stack direction of the ceramic layers, the dielectric layer is arranged between the internal electrodes,
wherein the dielectric layer is printed onto at least one sub-region of one of the ceramic layers,
wherein the dielectric layer does not extend up to the external electrodes and is spaced apart therefrom,
wherein the dielectric layer is sandwiched between two ceramic layers, and
wherein a material of the dielectric layer is different from a material of the ceramic layers.

2. The multilayer device according to claim 1, wherein the ceramic layers include varistor layers.

3. The multilayer device according to claim 1, wherein the dielectric layer has an extent D along the stack direction, and wherein 2 µm≤D≤6 µm.

4. The multilayer device according to claim 1, wherein the dielectric layer is arranged to reduce an overlap area between internal electrodes of opposite polarity.

5. The multilayer device according to claim 1, wherein, in a direction perpendicular to the stack direction, the at least one dielectric layer is divided into at least two portions separate from one another, and wherein the portions are separated from one another by a material of the ceramic layers.

6. The multilayer device according to claim 5, wherein an opening between the portions has a polygonal cross-section.

7. The multilayer device according to claim 5, wherein an opening between the portions has a round cross-section.

8. The multilayer device according to claim 1, wherein the at least one dielectric layer includes magnesium titanate.

9. The multilayer device according to claim 1, wherein the dielectric layer is arranged such that the dielectric layer, at least two adjacent ceramic layers and two overlapping internal electrodes form an ESD discharge gap.

10. The multilayer device according to claim 1, wherein the multilayer device has a function of a varistor as an ESD protection device.

11. The multilayer device according to claim 1, wherein the multilayer device has a capacitance of ≤0.5 pF.

12. The multilayer device according to claim 1, wherein the multilayer device has a plurality of dielectric layers, wherein, viewed along the stack direction, the dielectric layers are arranged one above the other between internal electrodes, wherein each dielectric layer is in each case printed onto a sub-region of one of the ceramic layers, and wherein each dielectric layer has an extent D with 2 µm≤D≤6 µm along the stack direction.

13. The multilayer device according to claim 1, wherein the main body of the multilayer device is terminated in the stack direction by a dielectric carrier material.

14. A multilayer device comprising:
a main body comprising:
at least two external electrodes,
at least one first internal electrode;
at least one second internal electrode, wherein each internal electrode is electrically conductively connected to an external electrode;
a plurality of ceramic layers, wherein the ceramic layers comprise the internal electrodes; and
at least one dielectric layer,
wherein, viewed along a stack direction of the ceramic layers, the dielectric layer is arranged between the internal electrodes,
wherein the dielectric layer is printed onto at least one sub-region of one of the ceramic layers,
wherein the dielectric layer does not extend up to the external electrodes and is spaced apart therefrom,
wherein the dielectric layer is sandwiched between two ceramic layers,
wherein a material of the dielectric layer is different from a material of the ceramic layers, wherein the at least two external electrodes are formed on opposing outer faces of the main body, wherein the at least one first internal electrode and the at least one second internal electrode are located in an interior of the main body, wherein the at least one first internal electrode is electrically conductively connected to one of the at least two external electrodes, and wherein the at least one second internal electrode is electrically conductively connected to another one of the at least two external electrodes not connected to the at least one first internal electrode.

* * * * *